United States Patent
Wiederhoeft

(12) 
(10) Patent No.: US 6,300,639 B1
(45) Date of Patent: Oct. 9, 2001

(54) PROCESS AND ARRANGEMENT FOR THE DEVICE CONFIGURATION OF CONFOCAL MICROSCOPES

(75) Inventor: Holger Wiederhoeft, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 09/298,760

(22) Filed: Apr. 23, 1999

(30) Foreign Application Priority Data

Jul. 4, 1998 (DE) .............................................. 198 29 944

(51) Int. Cl.$^7$ .................................................. G01N 21/64
(52) U.S. Cl. .................................... 250/458.1; 250/459.1; 356/317
(58) Field of Search .............................. 250/458.1, 459.1, 250/461.1, 462.2; 356/317, 318, 417

(56) References Cited

U.S. PATENT DOCUMENTS 5,127,730 * 7/1992 Brelje et al. ......................... 356/318
5,886,784 * 3/1999 Engelhardt ............................ 356/326

* cited by examiner

*Primary Examiner*—Georgia Epps
*Assistant Examiner*—Richard Hanig
(74) *Attorney, Agent, or Firm*—Reed Smith LLP

(57) ABSTRACT

A process for the device configuration of confocal microscopes, preferably of laser scanning microscopes is disclosed, in which laser light with one or more spectral lines is generated and directed on a specimen which contains a fluorescent dye or on which a fluorescent dye has been applied. In this connection, the excitation wavelengths and the emission wavelengths of different fluorescent dyes are recorded in separate data records and these data records are stored in a data storage. The laser spectra which are adjustable with the microscope and which are to be directed onto the specimen and the transmission spectra which can be achieved with the provided filters are likewise recorded in data records and these data records are stored. Presets for the configuration of the microscope are determined from a computational linking of these data records.

11 Claims, 6 Drawing Sheets

PROCESS AND ARRANGEMENT FOR THE DEVICE CONFIGURATION OF CONFOCAL MICROSCOPES

BACKGROUND OF THE INVENTION a) Field of the Invention

The invention is directed to a process for the device configuration of confocal microscopes, preferably of laser scanning microscopes, in which laser light with one or more spectral lines is generated and directed on a specimen which contains a fluorescent dye or on which a fluorescent dye has been applied, wherein the light reflected and/or emitted by the specimen serves as basis for an image evaluation and the quality of the image evaluation is influenced in that filters or filter combinations which correspond to the emission wavelength of the fluorescent dye are introduced into the microscope beam path. The invention is further directed to an arrangement for carrying out this process.

b) Description of the Related Art

Confocal microscopy, as a special further development of light microscopy, offers the possibility not only of a higher resolution of microstructures, but also imaging and measurement of these microstructures in the Z-coordinate of space. As a result of this, fluorescence technique has increasingly become a central focus of interest in the field of precision instrument construction and in science apart from the conventional contrasting methods of bright field, phase contrast and interference contrast.

Fluorescence technique is based on the fact that different fluorochromes whose excitation wavelengths and emission wavelengths lie in different spectral bands make it possible to show structures in a plurality of colors simultaneously. Thus, depending on the spectral characteristics of different dye molecules, information concerning the physiological parameters can be obtained in addition to morphological information.

When the confocal microscope is used for fluorometric processes, information may be deduced concerning changes in the concentration of ions and molecules. Also significant are indicators which, in addition to intensity dependence, point to a shift in the excitation spectrum or emission spectrum and, in this way, enable a quantification of ion concentrations. Individual lasers, each with a wavelength, or a "multi-line" mixed gas laser with a plurality of usable wavelengths are used as illumination sources.

A procedure of this kind, including the associated instrument technology, is described in "Mitteilungen für Wissenschaft und Technik [Science and technology notes]", Vol. II, No. 1, pages 9–19, June 1995. It is explained in detail therein that the design of the detection system must also be adapted to the emission wavelength in accordance with the steps carried out in the illumination path for point-accurate object illumination with different excitation wavelengths in the opposite direction. This entails detecting the spectrally different information from exactly the same region of the specimen, recording this information in exact pixels and preparing it for the image evaluation. Only in this way is it possible to record 3D data records which allow, for example, a reliable correlation of spatial cellular or tissue structures within the microarchitecture or the localization of a plurality of gene sites in chromosomes.

For sequential detection, for example, in the evaluation of reflections and emitted radiation in the fluorescent process, neutral splitters and single-dichroic splitter mirrors are used as excitation beam splitters in the confocal beam path, wherein it is necessary to exchange splitters between successive recordings. Blocking filters are used, for example, to limit the detected emission bands, wherein long-pass filters and bandpass filters can be used, if desired, for fine adjustment of the spectral separation.

All of the filter components are mounted in motor-operated filter wheels and are ready for use in that they can be exchanged for one another when correspondingly driven.

While the branching of the emission light into a plurality of detection channels has the advantage that illumination pinholes and detection pinholes are arranged in an exact confocal manner for all detectors, an increase in the number of detection channels results in an increase in the number of possible filter combinations. Consequently, a user of the confocal microscope must know the exact excitation wavelength and emission wavelength of a fluorescent dye in order to be able to make an image of the specimen or the image of a selected plane of the specimen with the microscope.

The invention utilizes, for example, the effect according to which the energy radiated into the dye with the excitation wavelength is subsequently transformed into a wavelength of lower energy and is radiated back from the dye. In this connection, the emission photons travel via the above-described mirrors, filters and color splitters in the respective detection channel where they encounter a photomultiplier (PMT) which detects and records them and makes them available for image processing.

In this connection, the path taken by every photon from the specimen to one of the detectors depends on the device setting that the user has selected. Thus, it is possible owing to subjective influences that the path predetermined for the photons by the selected device configuration can be correct, unfavorable or incorrect.

The setting of the device configuration is correct when laser light has been selected which has a spectral composition corresponding to the excitation radiation for a dye contained in the specimen and when the color splitters and filters whose transmission spectrum corresponds to the emission wavelength of the dye have been swung into the microscope beam path on the emission side.

A setting is unfavorable, i.e., functional but not optimum, when, for example, a laser configuration has been selected which corresponds to the excitation radiation of the dye, but the color splitters or filters which have been swung into the emission beam path only pass a portion of the emission spectrum. As a result, only weaker-than-optimum signals reach the respective detector. Selection of a laser wavelength which does not exactly correspond to the excitation wavelength of the selected dye has a similar effect.

A totally wrong setting results when the wrong laser is selected on the excitation side and/or a mirror combination or filter combination with a transmission spectrum adjacent to the emission spectrum has been selected on the emission side. The result is that the entire system cannot generate any images.

OBJECT AND SUMMARY OF THE INVENTION

On this basis, it is the primary object of the invention to further develop a process of the type described above in such a way that it is possible for the user to-quickly adjust an optimal device configuration for a selected dye without prior knowledge of the optical relationships.

According to the invention, this object is met in that the excitation wavelengths and the emission wavelengths of different fluorescent dyes are recorded in separate data records and these data records are stored in a data storage. The laser spectra which are to be directed onto the specimen and which are adjustable with the microscope and the transmission spectra which can be achieved with the provided filters and/or spectral splitters are likewise recorded in data records and these data records are stored.

According to the invention, presets for the configuration of the microscope are determined from a computational linking of these data records in that at least one laser spectrum is selected through the linking of the data records for the excitation wavelength of a predetermined fluorescent dye with all of the selectable laser spectra, wherein this at least one laser spectrum corresponds to the excitation wavelength of the given fluorescent dye. In this way, the transmission spectrum which corresponds to the emission wavelength of the given fluorescent dye is also determined by linking the data for the emission wavelength of this fluorescent dye with the data of the possible filter combinations.

Accordingly, the subjective selection of laser spectra and transmission spectra known from the prior art is replaced by process steps which enable an objective determination and presetting of the respective microscope configuration for every fluorescent dye whose excitation wavelengths and emission wavelengths are stored in the respective data records. Further, this achieves not only an optimum, but also a faster task-specific adjustment of the microscope than would be possible by means of manual procedures.

In a constructional variant of the invention, the excitation wavelengths of different fluorescent dyes are recorded and stored in a first data record, the adjustable laser spectra are recorded and stored in a second data record, the emission wavelengths of the fluorescent dyes are recorded and stored in a third data record and the adjustable filter-transmission spectra are recorded and stored in a fourth data record.

As a result of the computational linking of the first and second data records, at least one setting configuration is determined for the spectrum of the laser radiation corresponding to the excitation wavelength of a given fluorescent dye. In like manner, as a result of the computational linking of the third and fourth data records, at least one setting configuration is determined for the filter-transmission spectrum which corresponds to the emission wavelength of the given fluorescent dye.

The individual data records can be added to or corrected at any time. There exists a relationship between the first and third data records insofar as the stored data about the excitation wavelengths and emission wavelengths are to be associated with the same fluorescent dye and are made available for purposes of linking when the respective fluorescent dye is called up.

A very preferred construction of the invention is provided in that the data of all data records are recorded as a chain of binary data and in that every binary value of a chain of this kind is associated with a determined portion $\Delta\lambda$ in one and the same wavelength range $\lambda_1$ to $\lambda_2$. In this respect, a portion $\Delta\lambda$ is defined by a binary value of "0" whenever the radiation intensity to be measured in this portion $\Delta\lambda$, lies below a threshold y. On the other hand, a portion $\Delta\lambda$ in which the radiation intensity lies above the threshold y is defined by a binary value of "1".

For the data of a laser spectrum serving for the illumination of the specimen, this means that all portions $\Delta\lambda$ lying within the wavelength range from $\lambda_1$ to $\lambda_2$ in which the laser radiation is radiated on the specimen at an intensity lying above the threshold y are given a binary value of "1". All other portions $\Delta\lambda$ within the wavelength range from $\lambda_1$ to $\lambda_2$ in which the intensity lies below the threshold y are assigned the binary value "0".

For the data of the excitation wavelengths of the fluorescent dye, this means that only the portions $\Delta\lambda$ within the wavelength range from $\lambda_1$ to $\lambda_2$ in which the intensity of the laser light directed on the specimen lies above the threshold y are given a binary value of "1", wherein an excitation of the respective fluorescent dye is carried out with certainty. All other partial regions $\Delta\lambda$ in which the intensity lies below the threshold y and, to this extent, are not certain to be sufficient for excitation are given a binary value of "0".

For the data of the emission wavelengths, only the $\Delta\lambda$ of the wavelength range from $\lambda_1$ to $\lambda_2$ for which an intensity lying above the threshold y is to be measured when the dye is excited are given a binary value of "1".

With respect to the valuation of filters or filter combinations, a binary value of "1" is assigned only to the partial range $\Delta\lambda$ for which the respective filters or filter combinations are transparent at a radiation intensity lying above the threshold y. On the other hand, all other partial ranges $\Delta\lambda$ are given the binary value "0".

With this type of data acquisition, binary value chains are formed for all stored information from a quantity of binary values which always remains the same. Within every chain, the quantity of consecutive binary values "1" is a measurement for the respective bandwidth. The location of a binary value "1" or a plurality of consecutive binary values "1" is a measurement for the wavelengths

- which are suitable for excitation of the dye (in the first data record D1),
- at which radiation impinges on the specimen (in the second data record D2),
- at which radiation is emitted by the specimen (in the third data record D3) and
- for which a filter or a filter combination is transparent (in the fourth data record D4).

Therefore, all binary value chains are comparable with one another with respect to whether the binary values "1" contained therein represent identical or different wavelengths or identical or different spectral bands, For example, if the binary value chain of the excitation wavelength of a selected fluorescent dye (first data record) is compared with the binary value chain of a selected setting configuration for a laser spectrum (second data record), it can be determined from the locations of the binary values "1" in the two binary value chains whether the bandwidth of the laser spectrum covers the bandwidth of the excitation spectrum partially, completely or not at all.

In this case, for the configuration of the microscope it is only meaningful to associate the binary value chains of the two data records in which the locations of the binary values "1" coincide at least partially, and, whenever possible, completely.

The radiation intensity of the laser radiation impinging on the specimen serves as a criterion for whether a partial region $\Delta\lambda$ is valuated with a binary value of "0" or a binary value of "1",wherein the threshold y is preferably 50% of this radiation intensity.

In a particularly preferred construction of the invention, it is provided that the wavelength region on which the determination of all binary value chains is to be based begins with $\lambda_1=300$ nm and ends with $\lambda_2=700$ nm. Further, it is preferably provided that a partial region $\Delta\lambda$ corresponding to a bandwidth of 0.1 nm is associated with every binary value "0" or "1".

For purposes of a computational selection of a suitable laser spectrum, it is provided according to the invention that the binary value chain from the first data record which corresponds to the excitation wavelength of a given fluorescent dye is logically linked by means of an "AND" function with all binary value chains of the second data record successively. This linking in turn yields binary value chains from which that binary value chain containing the most consecutive binary values "1" is determined and recorded as finding or result. The laser spectrum whose binary value chain (from the second data record) has led to the recorded result, i.e., to the resulting binary value chain with the most consecutive binary values of "1", is now given for the configuration of the microscope.

For the selection of a suitable filter-transmission spectrum, the binary value chain from the third data record which corresponds to the emission wavelength of the given fluorescent dye is linked successively with all binary value chains of the fourth data record by an "AND" function. Here again, binary value chains are given, from which are selected those binary value chains in which at least one binary value of "1" occurs. Of these binary value chains, that binary value chain in which the most consecutive binary values of "1" occur is determined and recorded as result. The filter combination whose binary value chain (from the fourth data record) has led to the recorded binary value chain result is now predetermined for the configuration setting of the microscope.

As an alternative to the acquisition of data in the form of binary value chains and the determination of an optimum configuration of the microscope through a logical "AND" linking of these binary value chains, it is conceivable to valuate the laser light with a discrete wavelength as input quantity for an oscillatory circuit analogous to the calculation of oscillatory circuits in electrical engineering. In so doing, the filters can be simulated, for example, by RC networks. By varying R (resistance) and C (capacitance), the quality of a photoemission is calculated and valuated for every configuration of the laser scanning microscope. The result with the highest quality is then given as a configuration for the device setting. In this way, all combinations of light paths can be acquired and, as a result, the corresponding filters and color splitters can be swiveled into the microscope beam path.

The object of the invention is further met through a confocal laser microscope with a laser module for generating laser radiation which is directed to a specimen with at least one fluorescent dye and whose spectrum can be changed and which has filters of different transmission spectra which can electively be swiveled into the beam path of the light that is reflected and/or emitted by the specimen.

In this connection, it is provided in accordance with the invention that the laser module and the filters are connected with controllable adjusting devices, that a data storage is provided for data records of excitation wavelengths and emission wavelengths of the fluorescent dyes, for a data record of different adjustable laser spectra and for a data record of different adjustable transmission spectra, and further that there is a computing circuit for linking these data records whose output is connected with the adjusting devices via a controlling device.

An "AND" operation linking the data for the excitation wavelengths with the data of the possible laser spectra and an "AND" operation linking the data of the emission wavelengths with the data of the possible transmission spectra are provided in the computing circuit.

In developments of the laser microscope according to the invention, the laser module can have a plurality of single-line or multiple-line lasers which are controllable separately and/or are followed by a controllable and tunable spectral filter (AOTF) and/or by a controllable acousto-optic modulator (AOM) which serve as adjusting devices and which can be controlled in order to select different laser spectra.

Further, it is provided that a plurality of line filters and/or spectral splitters are arranged on filter wheels and can be exchanged with one another by rotating these wheels.

The invention will be described more fully hereinafter with reference to an embodiment example.

DESCRIPTION OF THE PREFERRED EMBODIMENTS

Figure 1:
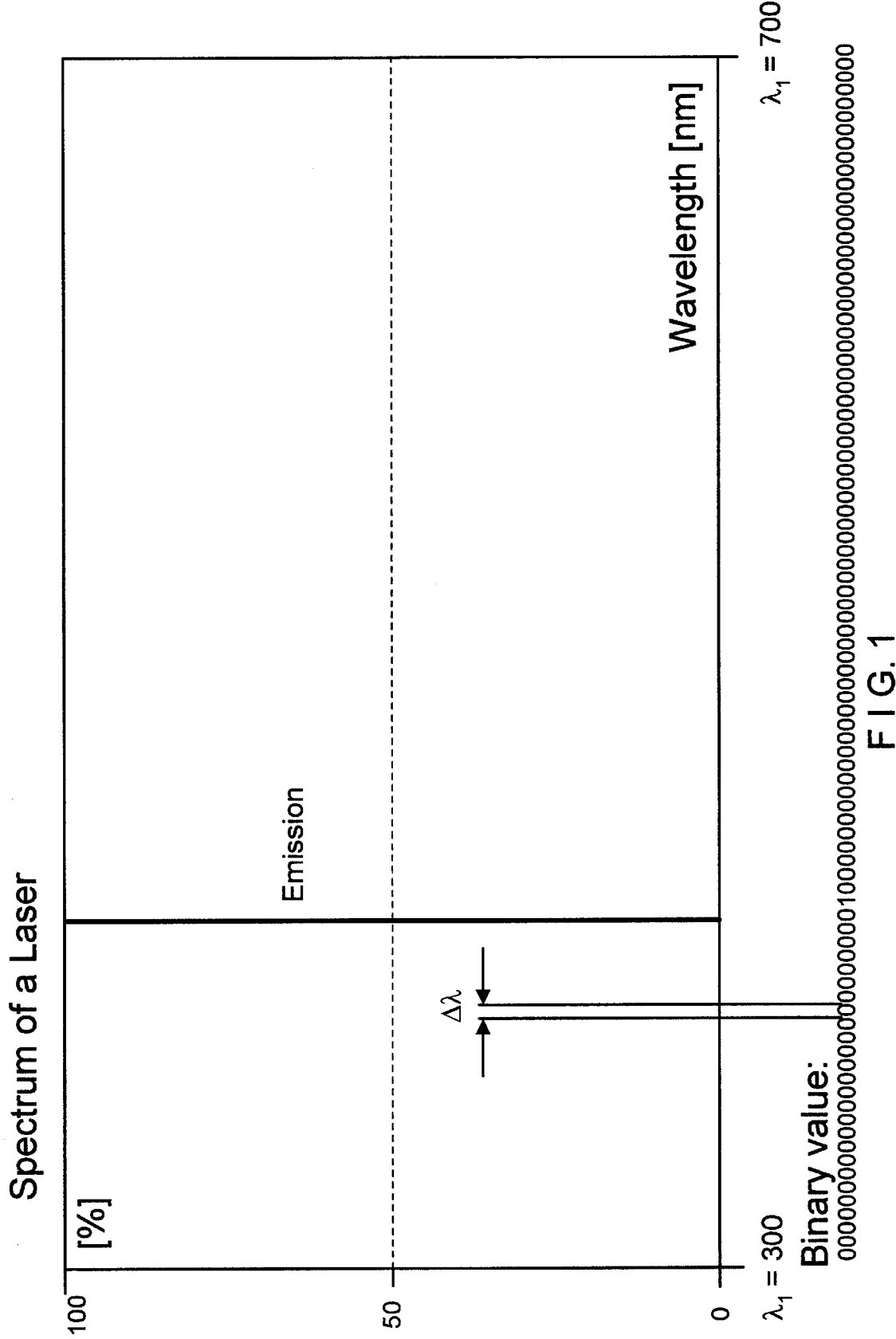
FIG. 1 is an example in graphical form for the bandwidth of a laser beam directed to the specimen, including the associated binary value chain.

FIG. 1 shows a graph in which the wavelength range $\lambda_1=300$ nm to $\lambda_2=700$ nm is plotted on the abscissa. A binary value chain in which a binary value of "0" or "1" corresponds to a partial range $\Delta\lambda$ is associated with this range.

The radiation intensity (%) is indicated on the ordinate of this graph. Of the binary values assigned to the individual partial ranges $\Delta\lambda$, only the binary values at which a radiation is present and at which this radiation has an intensity exceeding a threshold y, where threshold y is predetermined at 50% of the intensity impinging on the specimen, are defined by "1".

The embodiment example shows the radiation of a single-line laser with a bandwidth corresponding to a partial range $\Delta\lambda$, so that only a partial range $\Delta\lambda$ is to be given the binary value of "1" in this case.

Figure 2:
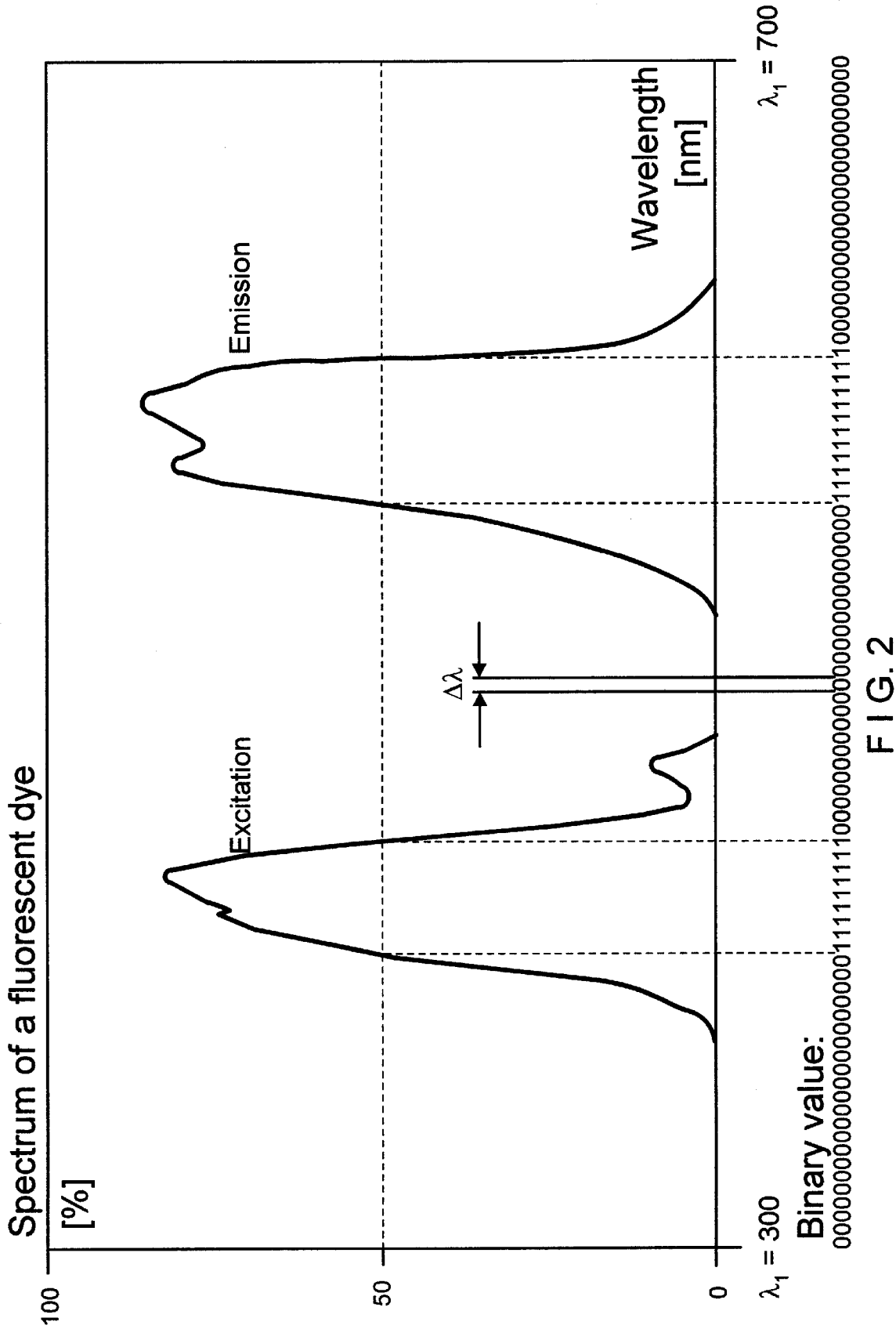
FIG. 2 is an example in graphical form of a binary value chain for a selected fluorescent dye for the excitation wavelength and for the emission wavelength.

In FIG. 2, a valuation of the excitation wavelengths and emission wavelengths of a selected fluorescent dye, not shown in more detail, is shown for the same wavelength range $\lambda_1$ to $\lambda_2$.

In this case, a binary value of "0" or "1" is likewise assigned to every partial range $\Delta\lambda$. The partial ranges $\Delta\lambda$ in which the radiation intensity which is required for exciting the dye to fluorescence lies below the threshold y is always defined by the binary value "0", whereas every partial range $\Delta\lambda$ in which the radiation intensity required for excitation of the dye lies above the threshold y is given a binary value of "1". The quantity of consecutive binary values "1" is a measurement for the bandwidth within which an excitation of the fluorescent dye is possible, given the assumed radiation intensity.

The emission bandwidth of the same fluorescent dye was likewise valuated in FIG. 2 in an analogous manner. As in the case of the excitation radiation, the quantity of consecutive binary values of "1" which are associated with the emission radiation is a measurement for the bandwidth of the emission radiation in this case as well.

Similarly, the transmission spectrum of a filter is shown in FIG. 3 again for the same wavelength range $\lambda_1$, to $\lambda_2$. In this case, the partial ranges $\Delta\lambda$ in which the radiation passes the filter at an intensity lying above the threshold y are defined by a binary value of "1". The quantity of consecutive binary values of "1" is a measurement for the filter bandwidth.

Figure 3:
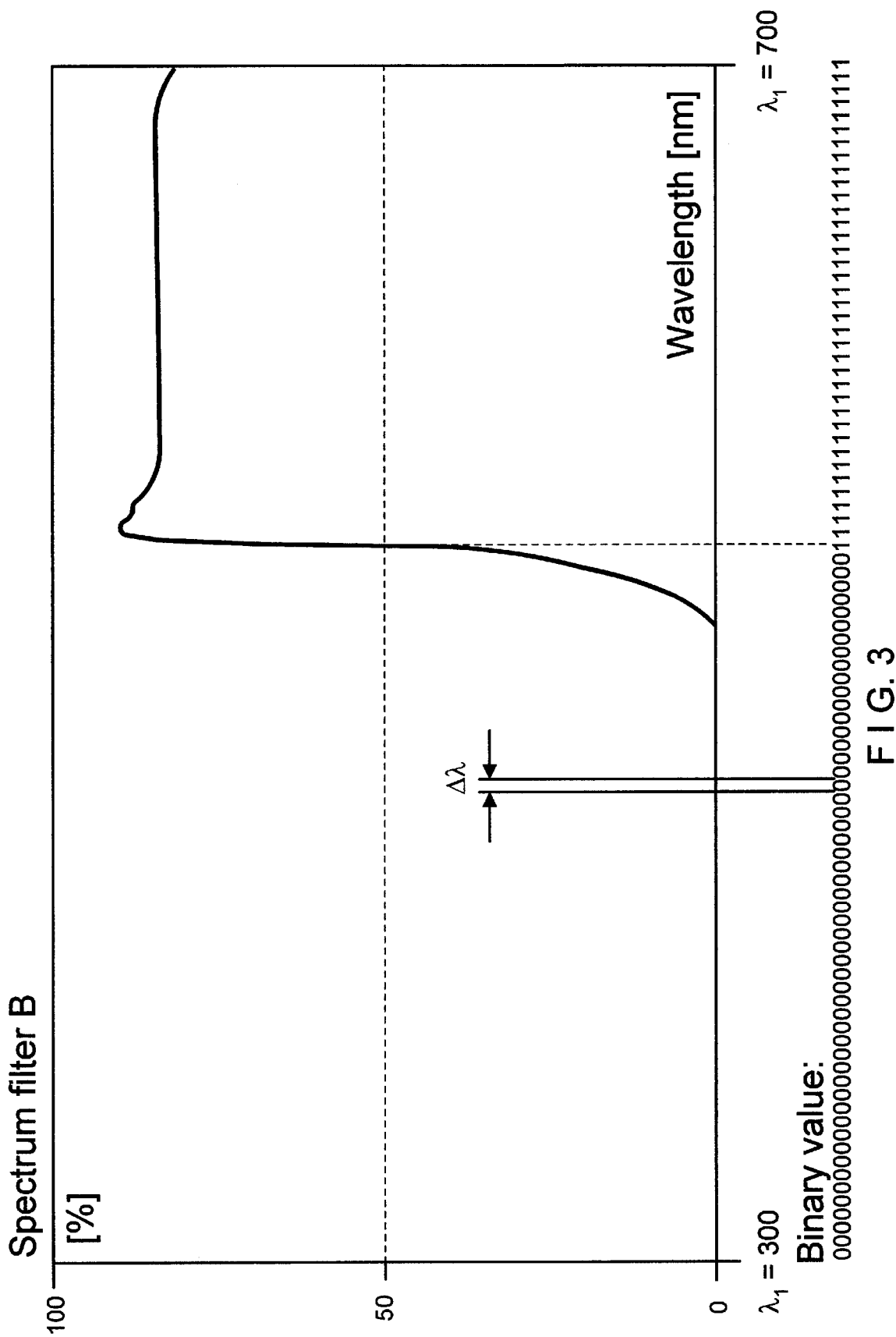
FIG. 3 is an example in graphical form for the transmission spectrum of a filter with associated binary value chain.

In each of these graphs according to FIG. 1 to FIG. 3, the location of the first binary value of wavelength $\lambda_1=300$ nm corresponds to the location of the last binary value of wavelength $\lambda_2=700$ nm. Since all binary value chains have the same number of partial ranges $\Delta\lambda$, the locations of all binary values situated therebetween are also defined, resulting in the comparability of the data for the laser spectrum, for the excitation wavelength and emission wavelength of a fluorescent dye, and for the filter-transmission spectra.

Figure 4:
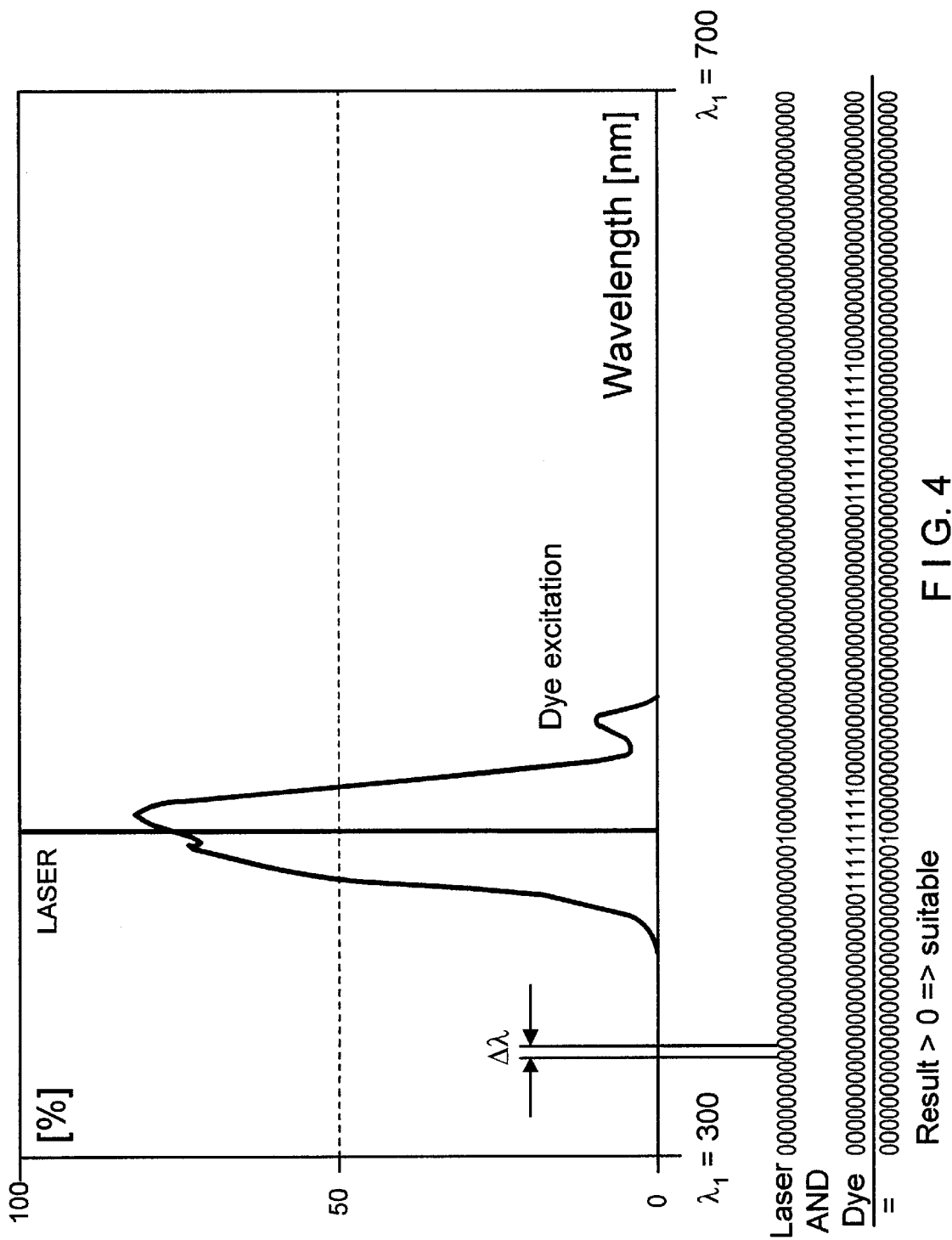
FIG. 4 is an example in graphical form for the logical linking of the spectra from FIG. 1 and FIG. 2.

An example of a comparison of this kind and the linking, according to the invention, of the data stored for the individual wavelengths or setting configurations is shown in FIG. 4.

In FIG. 4, the graph according to FIG. 1 and the graph with the excitation wavelength from FIG. 2 are superimposed. The respective binary value chains from FIG. 1 and FIG. 2 are shown below the graph and are linked with one another through an "AND" function. The result of the linking is likewise a binary value chain which, however, has a binary value of "1" only at the positions for partial ranges $\Delta\lambda$ for which a binary value of "1" is defined in the binary value chain according to FIG. 1 as well as in the binary value chain according to FIG. 2.

Therefore, it is to be gathered from the result that an excitation of the given fluorescent dye at sufficient radiation intensity can be carried out with the selected spectral characteristic of the laser radiation. This configuration is provided for presetting, so that an essential precondition for successful microscopy of the specimen is met.

All setting configurations with respect to laser spectra which, as a result of the linking of its binary value chain with the binary value chain of a fluorescent dye, give a chain in which no binary value of "1" is contained are not suitable for the configuration of the microscope.

Figure 5:
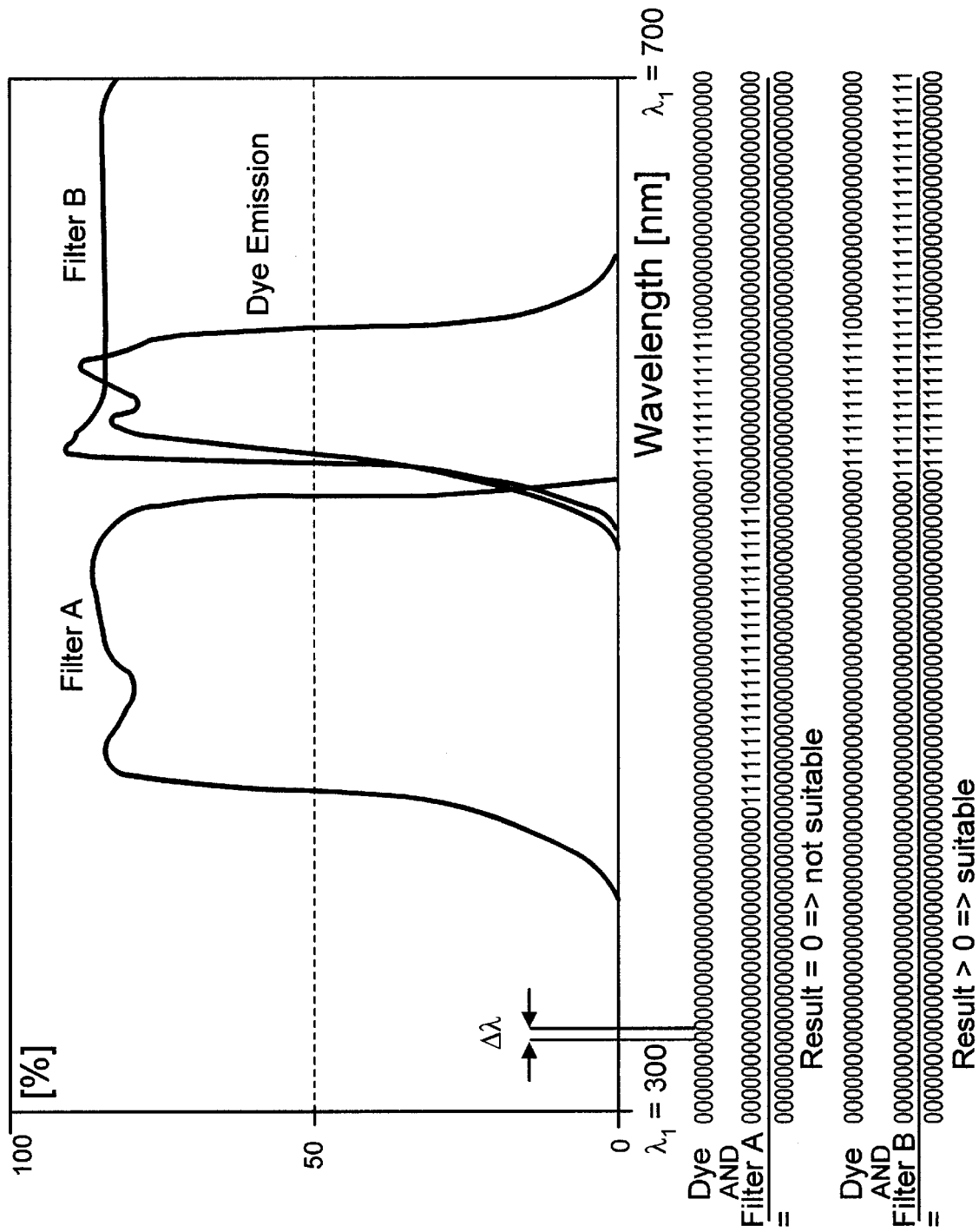
FIG. 5 is an example in graphical form for the logical linking of spectra from FIG. 2 and FIG. 3.

FIG. 5 shows the analogous procedure in the determination of a setting configuration for a filter-transmission spectrum which is adapted to the emission wavelength of a fluorescent dye according to FIG. 2. It can be seen that the linking of the binary data for the emission spectrum of a selected dye with the binary data of a filter A leads to the result that filter A is not suitable because no binary value of "1" occurs in the binary value chain shown as the result of the linking and the emission radiation can accordingly not pass the filter. In contrast, in the case of the linking of the binary data of the selected dye with the data for filter B, the consecutive binary values of "1" in the chain resulting from the linking show that this configuration is suitable.

Figure 6:
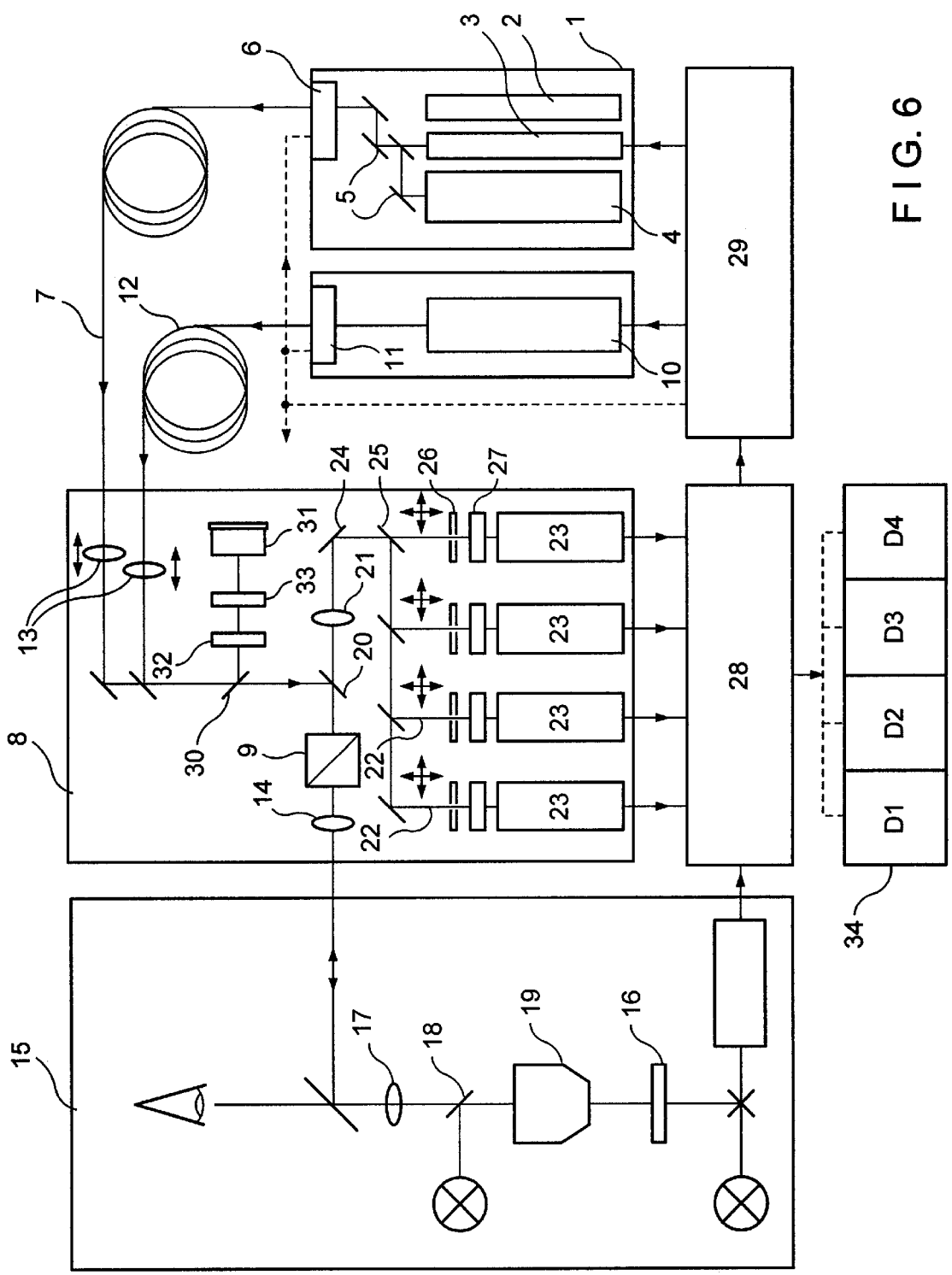
FIG. 6 shows the basic representation of a microscope arrangement in block diagram form for carrying out the process according to the invention.

FIG. 6 shows an example of a confocal laser microscope for carrying out the process according to the invention. Provided therein is a laser module 1 which is outfitted with lasers 2, 3 and 4 for generating laser light of wavelengths 633 nm, 543 nm and 488 nm for the visible range. The radiation emitted by lasers 2, 3 and 4 is coupled into a scanning device 8 via a plurality of beam unifiers 5, an AOTF 6 and a fiber 7, wherein the scanning device 8 is outfitted with a unit 9 deflecting the beam in the x and y coordinates.

A UV laser whose light is coupled into the scanning device 8 via an AOTF 11 and a light-conducting fiber 12 is provided in a second laser module 10.

Following the light-conducting fibers 7 and 12 in the two beam paths are collimating optics 13 whose distance from the ends of the respective fibers can be varied and which are coupled with a controllable adjusting device (not shown in the drawing) for this purpose.

The laser radiation is coupled into the beam path of the microscope 15, shown schematically, by the beam-deflecting device 9 through a scanning objective 14 and is directed in this case onto a specimen 16 which contains a fluorescent dye or to which a dye of this type has been applied. On the way to the specimen, the laser radiation passes a tube lens 17, a beam splitter 18 and the microscope objective 19.

The light reflected and/or emitted by the respective irradiated location on the specimen travels through the microscope objective 19 back to the beam-deflecting device 9, then passes a beam splitter 20 and is directed to photomultiplier 23 by the imaging optics 21 after branching into several detection channels 22, wherein one of the detection channels 23 is associated with each photomultiplier 23. For the purpose of branching into the individual detection channels 22, the light is directed, for example, by a deflecting prism 24 to dichroic beam splitters 25. Pinholes 26 which are adjustable in the direction of and vertical to the radiation direction and which are variable in diameter are provided, along with emission filters 27, in each detection channel 22.

The outputs of the photomultipliers 23 lead to the signal inputs of an evaluating circuit 28 which is connected in turn with a controlling device 29. The outputs of the controlling device 29 are connected with the signal inputs of the laser modules 1 and 10 and with signals inputs of the adjusting devices for influencing the position of optical elements or component groups, such as the position of the collimating optics 13, pinholes 26 and the like (not shown in detail).

For example, the laser radiation coupled into the scanning device 8 is branched by a beam splitter 30, one of the branches being directed to an optoelectronic receiver 31 in front of which are arranged, on filter wheels, a plurality of line filters 32 which can be exchanged with one another and neutral filters 33 which can likewise be exchanged with one another by rotating the filter wheels. The output of the receiver 31 is likewise applied to a signal input of the evaluating circuit 28. The filter wheels on which the line filters 32 and neutral filters 33 are arranged are coupled with adjusting devices whose control inputs are connected with signal outputs of the controlling device 29 (not shown in the drawing).

Further, the evaluating circuit is connected with a data storage 34 in which are stored the data records D1 to D4 of excitation wavelengths and emission wavelengths of different fluorescent dyes, laser spectra and adjustable transmission spectra in such a way that each can be called up in a separate data record.

The evaluating circuit 28 contains a computing circuit for the linking of the data of the first data record D1 with the second data record D2 and of the data of the third data record D3 with the fourth data record D4 as was already shown above in accordance with the invention. The respective computational results are given in the above-described form of adjusting commands via the controlling device 29 to the two AOTFs 6 and 11 and to the adjusting devices to which are connected the emission filters 27 and, for example, also the pinholes 26 which can be changed with respect to position and diameter.

While the foregoing description and drawings represent the preferred embodiments of the present invention, it will be obvious to those skilled in the art that various changes and modifications may be made therein without departing from the true spirit and scope of the present invention.

What is claimed is:

1. A process for the configuration of a confocal laser microscope before or during the examination of a specimen which contains at least one fluorescent dye or on which at least one fluorescent dye has been applied, comprising the steps of:

selecting a laser spectrum corresponding to the excitation wavelength of the respective fluorescent dye and directing it onto the specimen;

selecting optical filters whose transmission spectra correspond to the emission wavelength of the fluorescent dye for swiveling into the microscope beam path;

recording the excitation wavelengths and the emission wavelengths of different fluorescent dyes, the adjustable laser spectra and the adjustable filter-transmission spectra in separate data records and storing them in a data storage; and determining presets for the configuration of the microscope from a computational linking of the data records.

2. The process according to claim 1, wherein the excitation wavelengths of fluorescent dyes are recorded and stored in a first data record, the adjustable laser spectra are recorded and stored in a second data record, the emission wavelengths of the fluorescent dyes are recorded and stored in a third data record and the adjustable filter-transmission spectra are recorded and stored in a fourth data record, wherein, as a result of the computational linking of the first and second data record, at least one setting configuration is determined for the spectrum of the laser radiation corresponding to the excitation wavelength of a given fluorescent dye, and wherein, as a result of the computational linking of the third and fourth data record, at least one setting configuration is determined for the filter-transmission spectrum which corresponds to the emission wavelength of the given fluorescent dye.

3. The process according to claim 1, wherein the data of all data records are recorded as a chain of binary values and every binary value of a chain is associated with a determined portion $\Delta\lambda$ of a wavelength range $\lambda_1$ to $\lambda_2$, wherein a binary value of "0" is always assigned to a portion $\Delta\lambda$ in which a given radiation intensity lies below a threshold y and a binary value of "1" is always assigned to a portion $\Delta\lambda$ in which this radiation intensity lies above the threshold y.

4. The process according to claim 3, wherein the radiation intensity is based on the laser radiation impinging on the specimen and the threshold y is 50% of this radiation intensity.

5. The process according to claim 1, wherein the wavelength range is $\lambda_1=300$ nm to $\lambda_2=700$ nm and every binary value corresponds to a $\Delta\lambda=0.1$ nm.

6. The process according to claim 1, wherein for the purpose of selecting a laser spectrum:

the binary value chain from the first data record which corresponds to the excitation wavelength of a given fluorescent dye is logically linked by an "AND" function with all binary value chains of the second data record successively, wherein there is determined from the resulting binary value chains the binary value chains in which a binary value of "1" occurs at least once, wherein the binary value chain containing the most consecutive binary values "1" is determined therefrom and recorded as result, and wherein the laser spectrum whose binary value chain has led to the recorded result is given for the configuration of the microscope.

7. The process according to claim 1, wherein for the purpose of selecting a filter-transmission spectrum:

the binary value chain from the third data record which corresponds to the emission wavelength of a given fluorescent dye is linked successively with all binary value chains of the fourth data record by an "AND" function, wherein there is determined from the resulting binary value chains those binary value chains in which at least one binary value of "1" occurs, wherein the binary value chain containing the most consecutive binary values "1" is determined therefrom and recorded as result, and wherein the filter-transmission spectrum whose binary value chain has led to the recorded result is given for the configuration of the microscope.

8. A confocal laser microscope comprising:

a laser module for generating laser radiation which is directed to a specimen with at least one fluorescent dye and whose spectrum can be changed and which has filters of different transmission spectra which can electively be swiveled into the beam path of the light that is reflected and/or emitted by the specimen;

said laser module and said filters being connected with controllable adjusting devices;

a data storage being provided for data records of excitation wavelengths and emission wavelengths of different fluorescent dyes, of laser spectra and of adjustable transmission spectra; and a computing circuit being provided for linking the data records whose output is connected with the adjusting devices via a controlling device.

9. The confocal laser microscope according to claim 8, wherein an "AND" operation linking the data records of the excitation wavelengths with the data records of the adjustable laser spectra and an "AND" operation linking the data records of the emission wavelengths with the data records of the adjustable transmission spectra are provided in the computing circuit.

10. The confocal laser microscope according to claim 8, wherein a plurality of single-line or multiple-line lasers which are followed by a tunable optical filter and/or by a controllable optical modulator for adjusting different laser spectra are provided in the laser module.

11. The confocal laser microscope according to claim 8, wherein there are a plurality of line filters which are arranged on filter wheels and which can be exchanged with one another by rotating the filter wheels and/or a plurality of spectral splitters which are arranged on splitter wheels and which can be exchanged with one another by rotating the splitter wheels, wherein the filter wheels and the splitter wheels are coupled in each instance with adjusting devices which are controllable by electromechanical means.

* * * * *